United States Patent [19]

Dahl

[11] 3,867,865
[45] Feb. 25, 1975

[54] TWO-PART, TWO-MATERIAL FASTENING ELEMENT

[76] Inventor: Norman C. Dahl, 40 Fern St., Lexington, Mass. 02173

[22] Filed: June 18, 1973

[21] Appl. No.: 370,966

Related U.S. Application Data

[63] Continuation-in-part of Ser. No. 223,259, Feb. 3, 1972, Pat. No. 3,757,630.

[52] U.S. Cl. ................................. 85/62, 10/27 R
[51] Int. Cl. ........................................... F16b 31/02
[58] Field of Search .................. 85/62, 61; 151/38; 10/27 R

[56] References Cited
UNITED STATES PATENTS

| | | | |
|---|---|---|---|
| 2,824,481 | 2/1958 | Johnson | 85/62 |
| 3,323,403 | 6/1967 | Waisman | 85/62 |
| 3,383,974 | 5/1968 | Dahl | 85/62 |
| 3,757,630 | 9/1973 | Dahl | 85/62 |

FOREIGN PATENTS OR APPLICATIONS

| | | | |
|---|---|---|---|
| 900,231 | 7/1962 | Great Britain | 85/62 |

Primary Examiner—Marion Parsons, Jr.
Attorney, Agent, or Firm—Richard P. Crowley

[57] ABSTRACT

A two-part, two-material fastening element, such as a bolt or nut, incorporating a yielding section designed to indicate a predetermined bolt force by plastic deformation of the yielding section, wherein the part containing the yielding section is made of a material with stress-strain characteristics which are particularly suited to obtaining small variations in the bolt force indicated by the plastic deformation and which are different from the stress-strain characteristics of the material of which the other part is made.

11 Claims, 7 Drawing Figures

TWO-PART, TWO-MATERIAL FASTENING ELEMENT

REFERENCE TO PRIOR APPLICATION

This application is a continuation-in-part of my application U.S. Ser. No. 223,259, filed Feb. 3, 1972 (now U.S. Pat. No. 3,757,630).

BACKGROUND OF THE INVENTION

In the construction of threaded fastening elements, such as bolts or nuts, which incorporate yielding sections which deform to indicate when a predetermined force is acting in the bolt, it is necessary to control the stress-strain properties of the material in the yielding section to within close limits in order to obtain consistent accuracy in yielding at the predetermined force. Further, it is desirable to have a material which has low "work hardening" properties as the material deforms plastically.

My U.S. Pat. Nos. 3,383,974 and 3,431,812 describe nuts and bolts which have yielding sections for which these conditions obtain. In these nuts and bolts, however, there is little choice available to choose a material with low work-hardening properties, because the yielding section is an integral part of either the nut or the bolt and the stress-strain properties are dictated by other considerations, such as the requirements of strength and deformation of the threads of a nut or, for a bolt, the requirements to produce good fatigue performance.

In some designs, however (see my U.S. patent application Ser. No. 223,259 now U.S. Pat. No. 3,757,630 and application Ser. No. 223,156 now U.S. Pat. No. 3,757,372, both filed on Feb. 3, 1972, the contents of both of which applications are hereby incorporated by reference into this application), the bolt or nut is made of two parts which are joined to form the complete bolt or nut. In such elements, it is possible to make a choice of stress-strain properties for the yielding section unrestricted by other considerations.

SUMMARY OF THE INVENTION

My invention concerns a multiple-part, multiple-material fastening element designed to indicate a predetermined force applied to the device by plastic deformation of a yielding portion of the element. In particular, my invention relates to a two-part, two-material bolt or nut incorporating a yielding section designed to indicate a predetermined bolt force by plastic deformation of the yielding section, wherein the part containing the yielding section is made of a material with stress-strain characteristics which are particularly suited to obtaining small variations in the bolt force indicated by the plastic deformation, and which are different from the stress-strain characteristics of the material of which the other part is made.

My invention is directed towards taking advantage of the flexibility afforded fastening devices, such as in nuts and bolts, of two-part design in order to obtain better performance in yielding at predetermined bolt forces. The improved performance is obtained by selecting for the yielding section a material which has optimum stress-strain characteristics for producing minimum variation in bolt force at which yielding occurs in the nut or bolt when used in service, and by selecting a different material for the material of the other part.

More specifically, the invention relates to fastening element designs in which the yielding section's stress-strain characteristics are not dictated by other considerations of performance of the nut or bolt. The use of two materials for my two-part bolt is particularly preferred, since the requirements of a high-thread strength for the threaded portion of the bolt dictates a steel or other material which is characterized by high work-hardening, a property which is detrimental to accurate performance in the yielding region in yielding at a predetermined bolt force.

One such bolt design is the two-piece design set forth in my U.S. patent application Ser. No. 223,259 (now U.S. Pat. No. 3,757,630). In this design, the part which incorporates the yielding section is contained within the head of the bolt and the remainder of the bolt is formed by the other part. Thus, considerations of fatigue strength or thread strength and deformation do not affect choice of stress-strain properties for the yielding section, with the results that the choice of stress-strain properties can be made on the basis of accurate performance in yielding at a predetermined bolt force.

The Dahl and Tabor U.S. patent application Ser. No. 223,156 (now U.S. Pat. No. 3,757,372) discloses a two-piece nut design. However, the yielding section is incorporated in the part of the nut which contains the threads, and thus its stress-strain properties are dictated by the property requirements of the threads. This difficulty is removed by adopting the design used in my application Ser. No. 223,259; namely by reversing the geometry in the region wherein the two parts are joined together, thus incorporating the yielding section in the part which does not contain threads. With this change, the choice of material for the yielding section can be based on considerations which are critical to producing yielding at a predetermined bolt force and independent of the threads requirements.

In choosing the material for the yielding section, the objectives are to obtain material properties, such as stress-strain characteristics, consistency of characteristics from one batch of material to the next, and adaptability to economical and accurate control during the manufacturing process, which will produce consistently accurate indications of a predetermined bolt force when the bolt or nut is used in service.

DESCRIPTION OF THE PREFERRED EMBODIMENT

Figure 1:
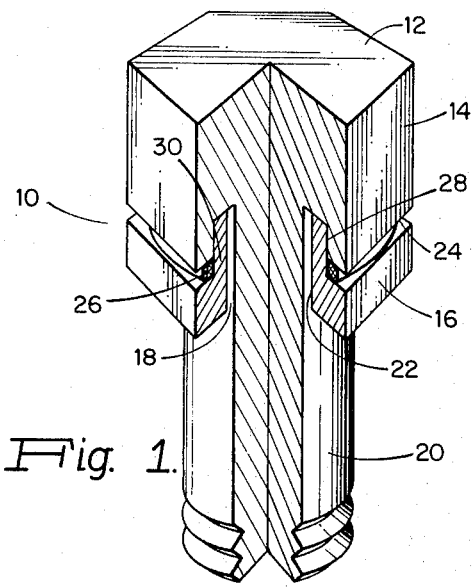
FIG. 1 is an isometric section of a two-part, two-material bolt.
Figure 2:
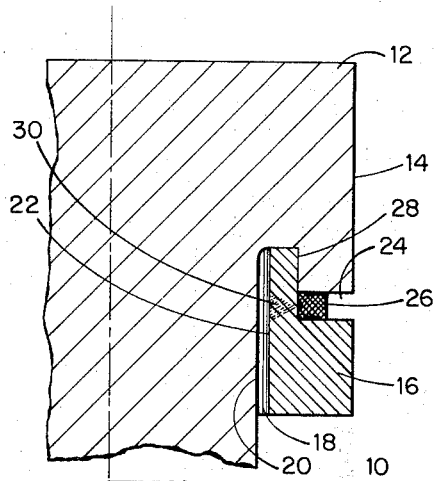
FIG. 2 is a sectional view of the two-part, two-material bolt head of FIG. 1.

FIGS. 1 and 2 show a two-part, two-material bolt 10 of my invention having a bolt head 12 and an external wrenching surface 14. The bolt head comprises an integrally formed element and a force ring extension element 16 composed of a different material from the body of the bolt and integrally formed bolt head. The force ring 16 is a separate part matingly engaged as shown with the cylindrical extension of the integrally formed element of the bolt head along the contact surface line 28. The bolt is assembled by inserting the sleeve-like extension of the force ring 16 into contact with the internal cylindrical groove of the integrally formed element of the bolt head. My two-part, two-material bolt includes a radial clearance space 18 between the external surface 20 of the bolt 10, and the internal cylindrical surface 22 of the sleeve-like extension of the force ring 16. An external, radially directed annular groove 24 is formed on the outer surface of the wrenching surface 14 by the mating of the integrally formed bolt head element and the force ring element, which groove contains therein an incompressible flowable material 26. The external groove and force ring have the dimensions as set forth in the parent application (U.S. Serial No. 223,259 now Patent No. 3,757,630) to provide a shear or yielding region in the bolt head, generally shown as 30, which region is typically conical and moves inwardly on the application of a predetermined force, with consequent narrowing of the external groove 24 and extrusion of the incompressible, flowable material 26 to signal that the bolt carries the predetermined force. As illustrated, the bolt is composed of two separately formed and material parts. The force ring part 16 which contains the yielding region 30 is composed of a material B and the bolt and integrally formed bolt head part of a material A, the materials selected to have the particular properties as hereinafter described.

Figure 3:
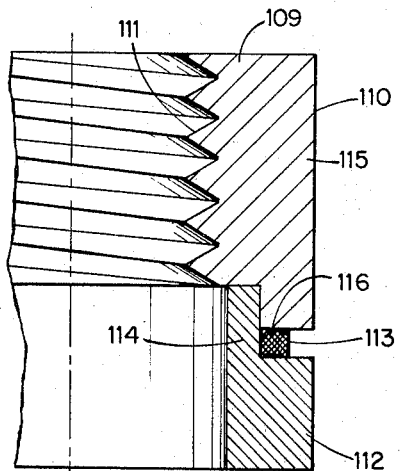
FIG. 3 is a sectional view of a two-part, two-material nut in which the geometry in the region wherein the yielding section is incorporated is a part which does not contain threads.

FIG. 3 shows a two-part, two-material nut 109 with external wrenching surface 110. The first part 115 has integrally formed threads 111 and a cylindrical extension which engages a sleeve of the second part 112, the force ring, when the threaded part 115 and the force ring part 112 are assembled, to form the complete nut 110. The assembled nut has an external radially directed annular groove 113 containing an incompressible flowable material 116. The yielding section 114 is the material in the sleeve in the region radially inward of the external groove 113. When the force in the bolt on which the nut is engaged is such as to cause the yielding section 114 to deform plastically, the conical yielding section 114 moves radially inwards and the external groove 113 closes. The threaded part 115 is composed of a material A and the force ring part 112 which contains the yielding section 114 of a material B, the materials selected to have the particular properties as hereinafter described.

Figure 4:
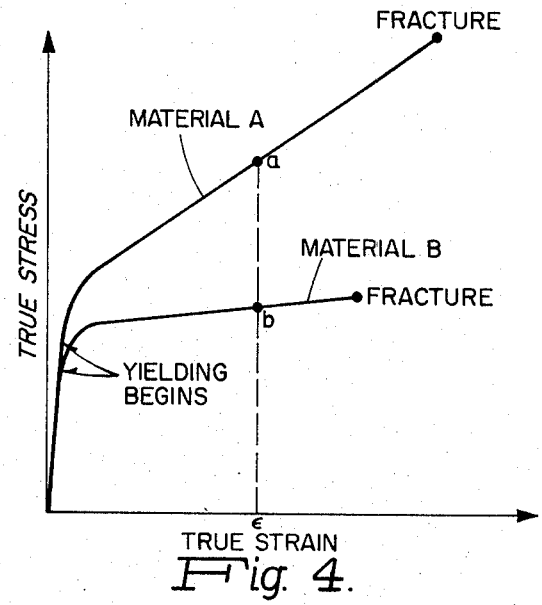
FIG. 4 depicts a graph of the stress-strain characteristics of two different materials A and B.

FIG. 4 shows the stress-strain behavior of two materials A and B with quite different properties of deformation. "True" stress is the load per unit area of deformed material. This is to be contrasted with "nominal" stress, which is the usual implication when the term "stress" is used, the load per unit area of undeformed material. True strain is obtained by summing up the increments of strain along the loading path, each increment of strain being obtained by dividing the increment of deformation by the then existing dimension of the element undergoing deformation. This is to be contrasted with nominal strain which is obtained by dividing the total deformation of the element by its original dimension. Extensive experimental and theoretical work has established that true stress and true strain are the measures of stress and strain which are needed to discuss and predict plastic deformation of materials.

"Work hardening" is a measure of the increase in stress required to produce additional plastic deformation; i.e., produce additional strain. When, as is the case with most steels, the stress-strain behavior is essentially linear in the plastic range, as illustrated for materials A and B in FIG. 4, the work hardening of a material is the slope of this straight-line portion of the stress-strain curve in the plastic range. Thus, in FIG. 4, the material A has a substantially greater work-hardening characteristic than does material B. The material B has very low work hardening.

Figure 5:
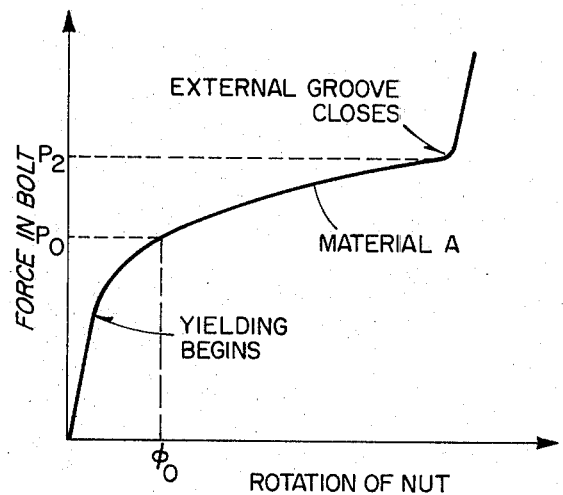
FIG. 5 depicts a graph of the behavior of the yielding section of either the bolt head of FIGS. 1 and 2 or the nut of FIG. 3 when constructed of material A of FIG. 4.
Figure 6:
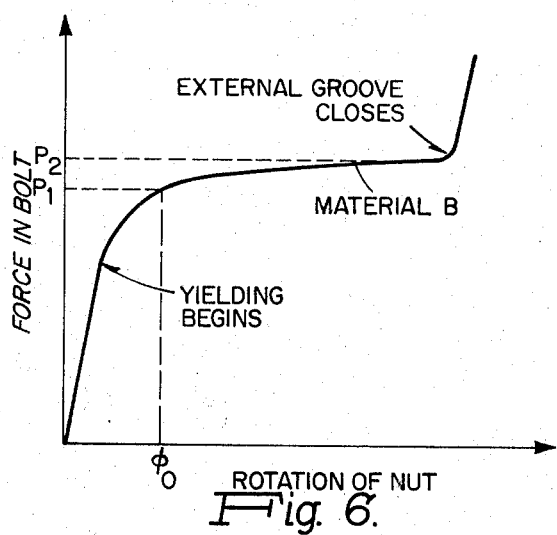
FIG. 6 depicts a graph of the behavior of the yielding section of either the bolt head of FIGS. 1 and 2 or the nut of FIG. 3 when constructed of material B of FIG. 4.

FIGS. 5 and 6 show the behavior of the bolt head of FIGS. 1 and 2 or the nut of FIG. 3 when the part containing the yielding section is made, respectively, of materials A and B. In both cases, the yielding section has been designed such that the external groove will close at some predetermined bolt force $P_2$.

In both cases, yielding begins at some bolt force below the design level of $P_2$. The bolt force at which yielding begins in the material A is lower than that at which yielding begins in the material B. Further, the deformation (force-rotation) curve for material B is "flatter" than that for material A, which is to say that for any given angle of rotation of the nut, the bolt force produced by the yielding section of material B is closer to the design bolt force $P_2$ than is the bolt force produced by the yielding section of material A. As illustrated, for the nut rotation $\phi_0$, the force $P_1$ produced by material B is greater than the force $P_0$ produced by material A. A flatter deformation curve is desirable in practice for two reasons: First, the onset of yielding is more noticeable by the workman tightening the nut. After yielding begins, the torque required to turn the nut increases at a slower rate because the bolt force is increasing less with each increment of rotation of the nut, as may be seen by comparing FIGS. 5 and 6. Second and more importantly, in situations where the external groove is not to be closed entirely, the amount by which the bolt force is below the design level $P_2$ is less dependent on the total angle through which the nut has been turned, thus leading to more accurate bolt forces under service conditions where determination of the exact angle of rotation is very difficult after the rotation has occurred.

It is incongruous that the yielding section of material A begins to yield at a lower bolt force than does the yielding section of material B, since, as is illustrated in FIG. 3, yielding in material A begins at a higher stress than it does in material B. The explanation for this fact can be found by considering how the yielding section deforms plastically. If the yielding section is made with the same axial width of external groove, then the strain which the material undergoes when the external groove closes is essentially the same independent of the stress-strain behavior of the material. What does change is the stress existing in the material. For example, if the strain E exists in the material when the external groove closes, then the stress in the material A will be that corresponding to point $a$ and that in material B will be that corresponding to point $b$. For equal radial thicknesses, the material A yielding section will require a much larger bolt force to close the external groove. For closing of the groove at the same bolt force, the material A yielding section will require a smaller radial thickness. With a smaller radial thickness, the strain in the material A, when the groove closes, is likely to be smaller than that in the material B yielding section, but not substantially smaller. As a consequence, the ratio of the stress at which yielding begins in material A to the stress required to close the groove (point $a$) is less than the ratio of the stress at which yielding begins in material B to the stress required to close the groove (point $b$). This explains why the yielding section of material A begins to yield at a lower bolt force than does the yielding section of material B.

Another stress-strain characteristic which is desirable for the material of the part with the yielding section, in addition to low work hardening, is the lowest initial yield stress possible consistent with such considerations as bearing stress requirements on the bottom surface of the force ring, and constraint on the geometry of the external groove in order that the radially inward plastic deformation will occur. The lower the initial yielding stress (with low work hardening), the greater will be the radial thickness of the yielding section. The greater the radial thickness, the smaller the percentage error in bolt force for a given geometric error in manufactured thickness of the yielding section. Thus, lower yield stress will permit greater tolerances during manufacture, and this will result in lower costs.

In both the bolt design in FIGS. 1 and 2 and the nut design of FIG. 3, it will be evident that the force ring elements (16 and 112, respectively) represent a small volume of the total material required to make either the bolt or the nut. This is a significant economic fact, because it is necessary to control very closely the stress-strain properties of the material from which the force ring is manufactured in order to produce consistently accurate performance in service. Consequently, the price of the force ring material will be high. The fact that it will be necessary to pay this premium price for only the relatively small volume of the force ring, and not for the total volume of material as before, in either the bolt or nut, will result in substantial savings of cost in manufacture.

The two stress-strain curves illustrated in FIG. 4 are representative of materials, such as steel, which would be used in a preferred embodiment of my invention. The body of the bolt or nut would require rather high yield stresses so that the threads would be able to carry the design bolt force. At the same time, the requirements of good fatique performance would require a relatively low initial yield stress. The combination of these two requirements would dictate a material with relatively high work hardening, a material similar to A in FIG. 4. For the force ring, it is evident from the discussion in the preceding paragraphs that the desirable material is one with stress-strain characteristics similar to material B.

Figure 7:
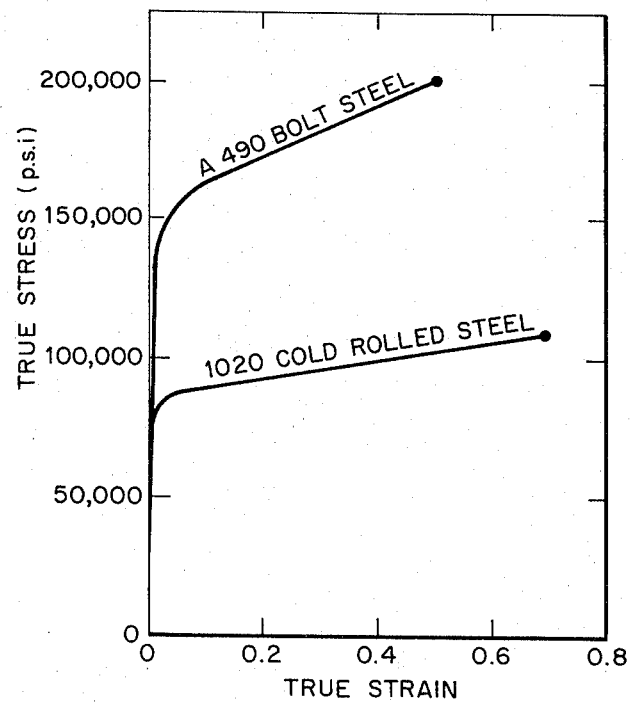
FIG. 7 depicts a graph of the stress-strain characteristics for two different steels: 1020 cold rolled steel and alloy steel used in A.S.T.M. A490 bolts.

In the United States, the accumulated experience as to the best steel characteristics for bolts and nuts to be used for various applications is standardized in the specifications of the American Society for Testing and Materials. A.S.T.M. Standard Specification A490-11 covers the chemical and mechanical requirements of quenched and tempered alloy steel bolts for structural steel joints. The tensile requirements for specimens machined from such bolts are depicted by the upper stress-strain curve in FIG. 7. The lower stress-strain curve is that of 1020 cold rolled steel, a low carbon steel in wide use for a varity of purposes. The work hardening (slope of the stress-strain curve in the plastic region; i.e., the increase in stress required to produce an increment in strain of 1.0) is approximately 90,000 psi for the A490 bolt steel and 30,000 psi for the 1020 cold rolled steel. It may be seen that the relationship between the properties of the A490 steel relative to the properties of the 1020 steel is similar to the relationship between the properties of the materials A and B in FIG. 4. Thus, 1020 cold rolled steel is an appropriate material from which to make force rings for use with A490 bolts: It would have a low initial yield stress (in the range of 85,000 psi) and a low work hardening (in the range of 30,000 psi). Other steels also would have stress-strain properties similar to those of 1020 cold rolled steel, and steels with different desired stress-strain properties (for use with other bolts or nuts) could be developed by those skilled in the arts of steel making and steel working.

Having described my invention, what I now claim is:

1. A two-part, two-material improved bolt, which bolt comprises in combination:
    a. a bolt head integrally secured to said bolt, said bolt head having a peripheral wrenching surface thereon and a cylindrical extension depending therefrom having an inner surface spaced apart from the outer surface of the bolt;
    b. a force ring extension element having substantially the same outer peripheral wrenching surface as the bolt head and a cylindrical sleeve extending therefrom, which, on being matingly engaged with the bolt head, forms an external groove on the outer wrenching surface, the bottom of said groove and the inner surface of the cylindrical sleeve defining an annular yielding section which plastically deforms radially inwardly when a predetermined force acts upon the bolt, with resulting reduction in the axial width of the external groove; and
    c. the bolt head and the force ring extension element formed of different materials, the force ring extension element containing the yielding section which plastically deforms radially inwardly when a predetermined force acts on the bolt being composed of a material with stress-strain characteristics which are particularly suited to obtain a small variation in the bolt force indicated by the plastic deformation, while the material of the bolt head differs in stress-strain properties from the material of the force ring extension element.

2. The bolt of claim 1 wherein the force ring extension element is composed of a material with a low work hardening and a low initial yielding stress as compared to the material of the bolt and integrally secured bolt head.

3. The bolt of claim 1 which includes a flowable incompressible material disposed within the external groove in the bolt.

4. The bolt of claim 1 wherein the force ring extension element is composed of a material with low work-hardening.

5. The bolt of claim 1 wherein the force ring extension element is composed of a material with a low initial yielding stress.

6. The bolt of claim 1 wherein the force ring extension element is composed of a material having an initial yielding stress in the range of 85,000 psi and a work-hardening in the range of 30,000 psi.

7. A two-part, two-material nut which comprises in combination:
   a. a first part having an outer wrenching surface thereon and a cylindrical extension depending from said first part, said extension forming an inner stepped groove, the first part containing a threaded portion thereon;
   b. a second part having substantially the same outer wrenching surface as the said first part and a cylindrical sleeve extending therefrom, which, on being matingly engaged with the inner groove of said first part, forms an annular external groove on the outer wrenching surface, the bottom of said groove and inner surface of the cylindrical sleeve defining an annular yielding section which plastically deforms radially inwardly when a predetermined force acts on the bolt to which the nut is attached, with resulting reduction in the axial width of the external groove; and
   c. the first and second parts composed of different materials, the second part containing the yielding section which plastically deforms inwardly when a predetermined force acts on the bolt being composed of a material with stress-strain properties which are particularly suited to obtain a small variation in the bolt force indicated by the plastic deformation, while the first part is composed of a material having different stress-strain properties from the material of the second part.

8. The nut of claim 7 wherein the second part containing the yielding section is composed of a material with low work-hardening and low initial yield stress properties as compared to the material of the first part.

9. The nut of claim 7 which includes an incompressible flowable material disposed in the annular groove of the nut.

10. The nut of claim 7 wherein the second part is composed of a material with low-work hardening.

11. The nut of claim 7 wherein the force ring extension element is composed of a material with a low initial yielding stress.

* * * * *

UNITED STATES PATENT OFFICE
CERTIFICATE OF CORRECTION

PATENT NO. : 3,867,865
DATED : February 25, 1975
INVENTOR(S) : Norman C. Dahl

It is certified that error appears in the above-identified patent and that said Letters Patent are hereby corrected as shown below:

In the title page, after "[76]" containing the name and address of the inventor, please insert the following paragraph:

--[*] Notice: The portion of the term of this patent subsequent to September 11, 1990 has been disclaimed.--

Signed and sealed this 29th day of April 1975.

(SEAL)
Attest:

RUTH C. MASON
Attesting Officer

C. MARSHALL DANN
Commissioner of Patents
and Trademarks